(12) United States Patent
Lee

(10) Patent No.: US 11,794,645 B2
(45) Date of Patent: Oct. 24, 2023

(54) APPARATUS AND METHOD FOR GIVING WARNING ABOUT VEHICLE IN VIOLATION OF TRAFFIC SIGNAL AT INTERSECTION

(71) Applicant: HYUNDAI MOBIS Co., Ltd., Seoul (KR)

(72) Inventor: Dong keon Lee, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 322 days.

(21) Appl. No.: 17/065,828

(22) Filed: Oct. 8, 2020

(65) Prior Publication Data

US 2021/0107402 A1    Apr. 15, 2021

(30) Foreign Application Priority Data

Oct. 10, 2019    (KR) .......................... 10-2019-0125698

(51) Int. Cl.
*B60Q 9/00* (2006.01)
*H04W 4/46* (2018.01)
(Continued)

(52) U.S. Cl.
CPC .............. *B60Q 9/008* (2013.01); *G08G 1/052* (2013.01); *G08G 1/166* (2013.01); *G08G 1/20* (2013.01); *H04W 4/46* (2018.02)

(58) Field of Classification Search
None
See application file for complete search history.

(56) References Cited

U.S. PATENT DOCUMENTS 6,459,386 B1 * 10/2002 Jones .................. G08G 1/0175
340/932.2
9,111,453 B1 * 8/2015 Alselimi ................ G08G 1/164
(Continued)

FOREIGN PATENT DOCUMENTS

CN    105551110    5/2016
CN    105551110 A  *  5/2016
(Continued)

OTHER PUBLICATIONS

Chinese Office Action dated Jun. 6, 2022, issued to CN Patent Application No. 202011078188.3.
(Continued)

*Primary Examiner* — Muhammad Adnan
(74) *Attorney, Agent, or Firm* — H.C. Park & Associates, PLC

(57) ABSTRACT

A method of providing a warning about a vehicle in violation of a traffic signal includes: transmitting, by a rear vehicle driving behind a front vehicle entering an intersection in a first direction, signal violation information to a nearby vehicle entering the intersection in a second direction different from the first direction through vehicle-to-vehicle (V2V) communication when the rear vehicle determines whether the front vehicle is in violation of a traffic signal at the intersection using sensing information obtained by sensing the front vehicle and determines that the front vehicle is in violation of the traffic signal; and generating, by the nearby vehicle, a warning about a risk of collision with the front vehicle using the signal violation information transmitted from the rear vehicle.

19 Claims, 4 Drawing Sheets

(51) Int. Cl.
*G08G 1/00* (2006.01)
*G08G 1/16* (2006.01)
*G08G 1/052* (2006.01)

(56) References Cited

U.S. PATENT DOCUMENTS

| | | | | |
|---|---|---|---|---|
| 10,217,354 | B1* | 2/2019 | Burke | G07C 5/008 |
| 11,475,766 | B1* | 10/2022 | Carson | G06F 16/447 |
| 2009/0224942 | A1* | 9/2009 | Goudy | G08G 1/164 |
| | | | | 340/905 |
| 2010/0073194 | A1* | 3/2010 | Ghazarian | G08G 1/096783 |
| | | | | 340/901 |
| 2010/0106413 | A1* | 4/2010 | Mudalige | B60W 50/14 |
| | | | | 701/469 |
| 2011/0187559 | A1* | 8/2011 | Applebaum | G08G 1/095 |
| | | | | 340/540 |
| 2013/0141576 | A1* | 6/2013 | Lord | G08G 1/162 |
| | | | | 348/148 |
| 2015/0243170 | A1* | 8/2015 | Collar | G08G 1/017 |
| | | | | 340/933 |
| 2017/0221366 | A1* | 8/2017 | An | G08G 1/096758 |
| 2017/0294117 | A1* | 10/2017 | Burke | H04N 7/181 |
| 2018/0018877 | A1* | 1/2018 | Townsend | G08G 1/096783 |
| 2019/0012912 | A1* | 1/2019 | Kim | G08G 1/096716 |
| 2019/0026886 | A1* | 1/2019 | Ferguson | G05D 1/0027 |
| 2019/0206255 | A1* | 7/2019 | Tao | G08G 1/00 |
| 2019/0248381 | A1* | 8/2019 | Yu | B60W 50/14 |
| 2020/0117928 | A1* | 4/2020 | Nishimura | G06T 7/20 |
| 2021/0024060 | A1* | 1/2021 | Adachi | B60W 30/18145 |
| 2021/0134156 | A1* | 5/2021 | Lee | B60W 40/04 |

FOREIGN PATENT DOCUMENTS

| | | |
|---|---|---|
| CN | 106097479 | 11/2016 |
| CN | 106769085 | 5/2017 |
| CN | 108447308 | 8/2018 |
| CN | 109686125 | 4/2019 |
| CN | 109830123 | 5/2019 |
| CN | 109987093 | 7/2019 |

OTHER PUBLICATIONS

Office Action of the corresponding Chinese Patent Application. No. 202011078188.3 dated Dec. 9, 2022.

* cited by examiner

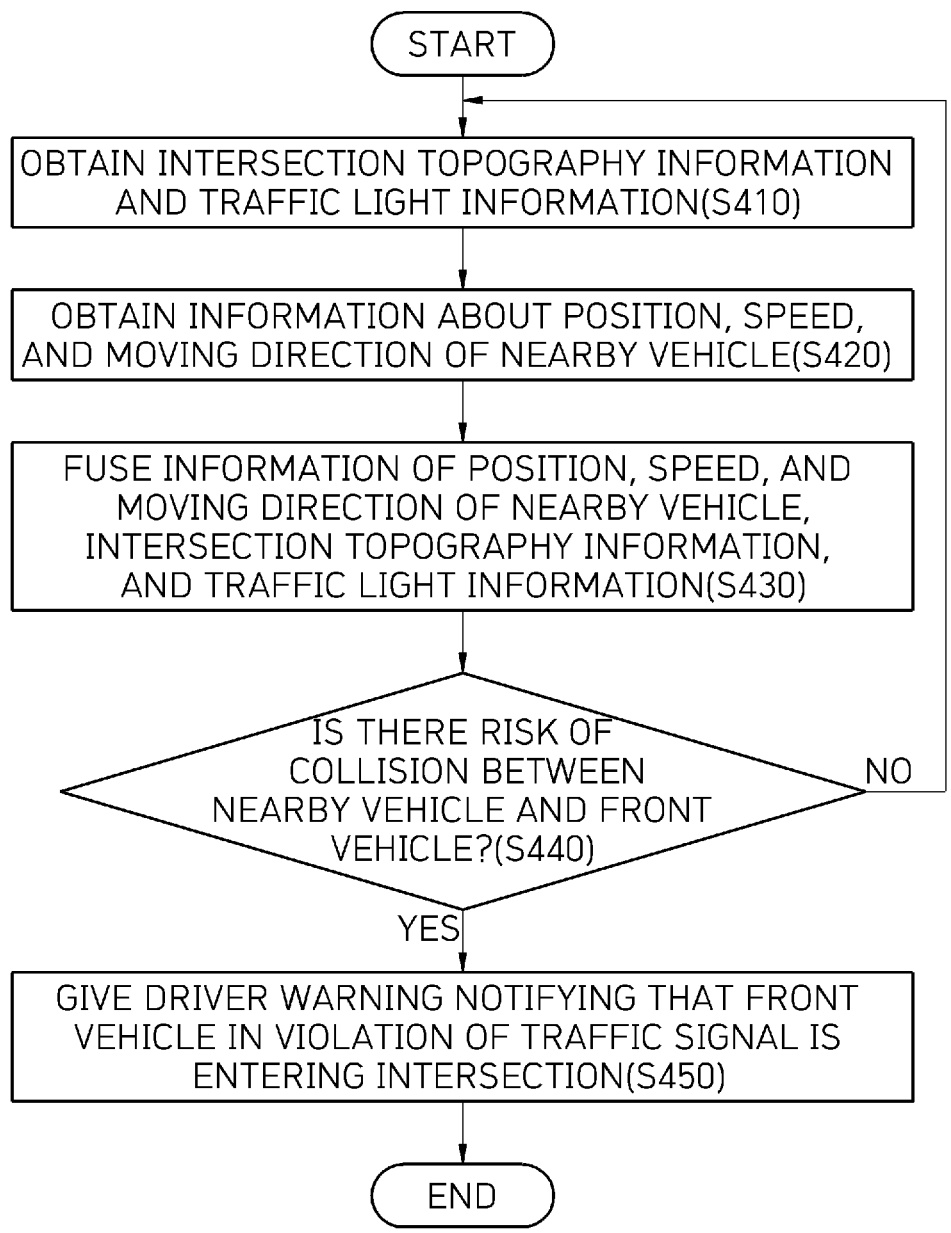

APPARATUS AND METHOD FOR GIVING WARNING ABOUT VEHICLE IN VIOLATION OF TRAFFIC SIGNAL AT INTERSECTION

CROSS-REFERENCE TO RELATED APPLICATION

This application claims priority from and the benefit of Korean Patent Application No. 10-2019-0125698, filed on Oct. 10, 2019, which is hereby incorporated by reference for all purposes as if set forth herein.

BACKGROUND

Field

Exemplary embodiments relate to an apparatus for warning a vehicle in violation of a traffic signal at an intersection, and more particularly, to an apparatus and method for warning a vehicle in violation of a traffic signal at an intersection using vehicle-to-everything (V2X) (e.g., vehicle-to-vehicle (V2V) and vehicle-to-infrastructure (V2I)) communication) and sensors.

Discussion of the Background

Research and development are being conducted on various collision warning systems to report a risk of collision between vehicles at an intersection.

Existing collision warning systems are not capable of predicting a collision at an intersection in an environment other than a line-of-sight situation when a warning about the collision at an intersection is given using a sensor.

In addition, the existing collision warning systems are not capable of using traffic light information to identify whether a nearby vehicle is in violation of a traffic signal.

An existing vehicle-to-everything (V2X) system is capable of determining whether nearby vehicles equipped with a V2X terminal are in violation of a traffic signal at an intersection but is not capable of warning drivers of vehicles that are not equipped with the V2X terminal.

The above information disclosed in this Background section is only for enhancement of understanding of the background of the invention and, therefore, it may contain information that does not constitute prior art.

SUMMARY

Exemplary embodiments of the present invention provide an apparatus and method for providing a warning about a vehicle in violation of a traffic signal at an intersection, which are capable of providing a warning about a risk of collision at an intersection even in an environment other than a line-of-sight situation, identifying whether a nearby vehicle is in violation of a traffic signal, and determining whether vehicles that are not equipped with a Vehicle-to-everything (V2X) terminal are in violation of a traffic signal.

The above-described aspects, other aspects, advantages and features of the present disclosure and methods of achieving them will be apparent from the following description of embodiments described below in detail in conjunction with the accompanying drawings.

An exemplary embodiment the present invention provides an apparatus for warning a vehicle in violation of a traffic signal, which is mounted in a nearby vehicle entering an intersection in a second direction, includes: a vehicle-to-everything (V2X) terminal configured to receive signal violation information of a front vehicle, which enters the intersection in a first direction different from the second direction, from a rear vehicle driving behind the front vehicle through vehicle-to-vehicle (V2V) communication; a controller configured to determine a risk of collision with the front vehicle using the signal violation information received from the V2X terminal; and a warning generator configured to generate a warning about the risk of collision according to a result of the determination received from the controller.

Another exemplary embodiment of the present invention provides an apparatus for warning a vehicle in violation of a traffic signal, which is mounted in a rear vehicle entering an intersection in a first direction, includes: a vehicle-to-everything (V2X) terminal configured to receive intersection topography information and traffic light information from a base station near the intersection through vehicle-to-infrastructure (V2I) communication; a sensor unit configured to obtain sensing information by sensing a front vehicle driving in front of the rear vehicle; and a controller configured to determine whether the front vehicle is in violation of a traffic signal at the intersection using the intersection topography information and the traffic light information, which are received from the V2X terminal, and the sensing information and transmit signal violation information corresponding to a result of the determination to a nearby vehicle entering the intersection in a second direction different from the first direction through the V2X terminal.

Another exemplary embodiment of the present invention provides a method of providing a warning about a vehicle in violation of a traffic signal includes: transmitting, by a rear vehicle driving behind a front vehicle entering an intersection in a first direction, signal violation information to a nearby vehicle entering the intersection in a second direction different from the first direction through vehicle-to-vehicle (V2V) communication when the rear vehicle determines whether the front vehicle is in violation of a traffic signal at the intersection using sensing information obtained by sensing the front vehicle and determines that the front vehicle is in violation of the traffic signal; and generating, by the nearby vehicle, a warning about a risk of collision with the front vehicle using the signal violation information transmitted from the rear vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4 is a flowchart of a process of generating a warning by a nearby vehicle on the basis of signal violation information of a front vehicle, which is obtained from a rear vehicle, according to an embodiment of the present invention.

DETAILED DESCRIPTION OF THE EMBODIMENTS

Figure 1:
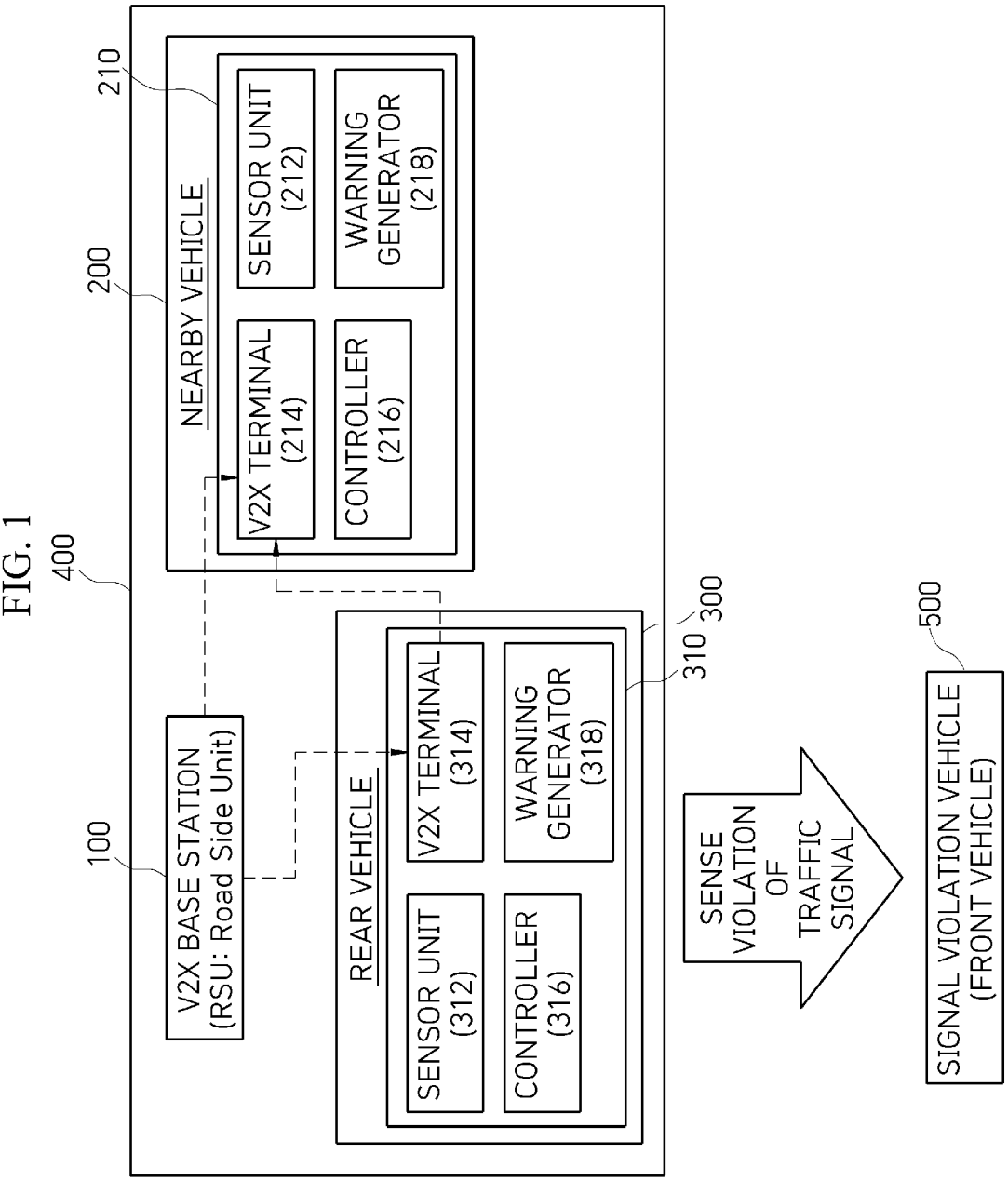
FIG. 1 is a diagram illustrating a situation of an intersection to which the present invention is applicable.

Hereinafter, embodiments of the present disclosure will be described in detail with reference to the accompanying drawings. Embodiments of the present disclosure are provided below to more fully describe the present disclosure to those of ordinary skill in the art and may be embodied in many different forms but the scope of the present disclosure is not limited thereto. Rather, these embodiments are provided so that the present disclosure will be thorough and complete and will fully convey the concept of the present disclosure to those of ordinary skill in the art. In the drawings, each component is exaggerated for convenience and clarity of description and the same reference numerals refer to the same elements. As used herein, the term "and/or" includes any and all combinations of one or more of the listed items.

The terms used herein are for the purpose of describing embodiments only and are not intended to be limiting of the present disclosure.

As used herein, singular forms may include plural forms unless the context clearly indicates otherwise. As used herein, the terms "comprises" and/or "comprising" specify the presence of stated shapes, integers, steps, operations, members, elements and/or groups thereof but do not preclude the presence or addition of one or more other shapes, integers, steps, operations, members, elements and/or groups thereof.

Figure 2:
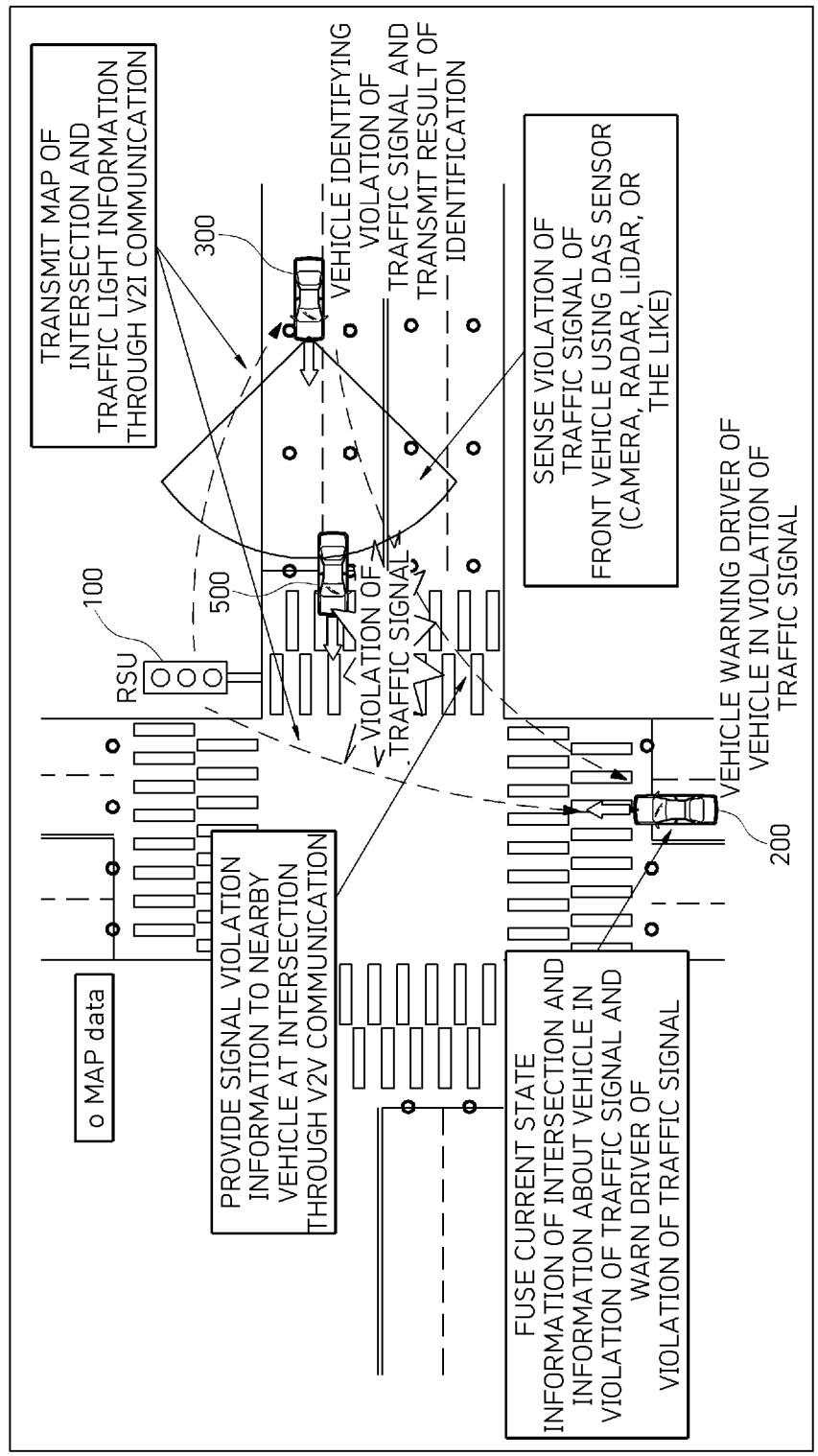
FIG. 2 is a block diagram of an apparatus for providing a warning about a vehicle in violation of a traffic signal at an intersection according to an embodiment of the present invention.

FIG. 1 is a block diagram of an apparatus for warning a vehicle in violation of a traffic signal at an intersection (hereinafter referred to as a "signal violation vehicle warning apparatus") according to an embodiment of the present disclosure. FIG. 2 is a diagram schematically illustrating an example of a situation of an intersection to which the apparatus of FIG. 1 for warning a vehicle in violation of a traffic signal at an intersection is applicable.

Referring to FIGS. 1 and 2, an entire system 400 according to an embodiment of the present disclosure includes a vehicle-to-everything (V2X) base station (Road Side Unit (RSU)) 100, a nearby vehicle 200, and a rear vehicle 300.

In the present embodiment, the nearby vehicle 200, the rear vehicle 300, and a vehicle (or front vehicle) 500 in violation of a traffic signal (hereinafter referred to as a "signal violation vehicle") are vehicles entering an intersection.

The rear vehicle 300 and the signal violation vehicle (or front vehicle) 500 are vehicles entering the intersection in a first direction. In this case, the rear vehicle 300 is a vehicle driving behind the signal violation vehicle (front vehicle) 500, and the signal violation vehicle (or front vehicle) 500 may be referred to as a "front vehicle" in front of the rear vehicle 300.

As illustrated in FIG. 2, it is assumed that the nearby vehicle 200 is a vehicle entering the intersection in a second direction different from the first direction, and at this time, the nearby vehicle 200 is in a situation where it is difficult to secure a clear view of the signal violation vehicle (front vehicle) 500 due to a variety of obstacles (nearby buildings or other vehicles).

That is, when the signal violation vehicle (front vehicle) 500 is driving through the intersection in violation of a traffic signal, it will be difficult for a driver of the nearby vehicle 200 to secure a clear view of the signal violation vehicle 500, thereby making it difficult to perform defensive driving against the signal violation vehicle (front vehicle) 500.

The V2X base station (RSU) 100 and the nearby vehicle 200 exchange information with each other through vehicle-to-infrastructure (V2I) communication. Similarly, the V2X base station (RSU) 100 and the rear vehicle 300 also exchange information with each other through V2I communication. The nearby vehicle 200 and the rear vehicle 300 exchange information with each other through vehicle-to-vehicle (V2V) communication.

In this case, it is assumed that the signal violation vehicle (front vehicle) 500 is not equipped with a communication terminal for performing V2I communication and V2V communication. In this case, the signal violation vehicle (front vehicle) 500 is not capable of performing V2I communication and V2V communication with any one of the V2X base station (RSU) 100, the nearby vehicle 200, and the rear vehicle 300.

As such, the rear vehicle 300 identifies violation of a traffic signal of the signal violation vehicle (front vehicle) 500 and transmits a result of the identification (information about the violation of the traffic signal) to the nearby vehicle 200 in a state in which the signal violation vehicle (front vehicle) 500 is not capable of communicating with the V2X base station (RSU) 100, the front vehicle 500, and the rear vehicle 300.

However, when the nearby vehicle 200 is capable of securing a clear view of (or sensing) the signal violation vehicle (front vehicle) 500, the nearby vehicle 200 may identify the violation of the traffic signal of the signal violation vehicle (front vehicle) 500 and transmit a result of the identification to other nearby vehicles.

The nearby vehicle 200 receives signal violation information from the rear vehicle 300 and additionally receives intersection topography information and traffic light information from the V2X base station (RSU) 100.

The nearby vehicle 200 fuses signal violation vehicle information, the intersection topography information, and the traffic light information and warns a driver thereof of a risk of collision with the signal violation vehicle 500 entering the intersection with the nearby vehicle 200.

In order to warn about a risk of collision with the signal violation vehicle 500, the nearby vehicle 200 is equipped with a signal violation vehicle warning apparatus 210. Similarly, the rear vehicle 300 is equipped with a signal violation vehicle warning apparatus 310 having the same configuration and function as the signal violation vehicle warning apparatus 210.

Because the signal violation vehicle warning apparatus 210 mounted in the nearby vehicle 200 and the signal violation vehicle warning apparatus 310 mounted in the rear vehicle 300 have the same configuration and function, the signal violation vehicle warning apparatus 210 mounted in the nearby vehicle 200 is as described above with respect to the signal violation vehicle warning apparatus 310.

The signal violation vehicle warning apparatus 310 mounted in the rear vehicle 300 includes a sensor unit 312, a V2X terminal 314, a controller 316, and a warning generator 318.

The sensor unit 312 detects the signal violation vehicle (front vehicle) 500 and obtains sensing information of the signal violation vehicle 500. The sensing information may be image data. To obtain such sensing information, the sensor unit 212 may include a camera, a radio detecting and ranging (radar) device, and a light detection and ranging (LiDAR) device. The sensor unit 212 inputs the obtained sensing information to the controller 216.

The V2X terminal 314 receives intersection topography information (map data) and traffic light information (Signal Phase and Timing (SPaT)) from the V2X base station 100 through V2I communication and inputs the received information to the controller 316.

The controller 316 processes the sensing information input from the sensor unit 312 to generate signal violation vehicle information. The signal violation vehicle information includes information indicating the presence or absence of the signal violation vehicle (front vehicle) 500, information representing the speed, position, and moving direction of the signal violation vehicle (front vehicle) 500, and the like. The controller 316 identifies the signal violation vehicle (front vehicle) 500 by generating the signal violation vehicle information.

In addition, the controller 316 determines whether the front vehicle 500 is in violation of a traffic signal or is highly likely to violate the traffic signal on the basis of fusion information obtained by fusing the intersection topography information and the traffic light information (SPaT), which are input from the V2X terminal 314, with the signal violation information (the speed, position, and moving direction of the front vehicle 500) and transmits a result of the determination to the nearby vehicle 200 through the V2X terminal 314.

Here, the fusing of information is a term that refers to fusing of different types of information, e.g., fusing image data, which may be obtained by a camera, an ultrasound sensor, a LiDAR device or a radar device, with digitized data such as a speed, a position, and a moving direction. A high-degree three-dimensional (3D) image of a surrounding environment of a vehicle may be created from a combination of such data.

A lane at which the front vehicle 500 is currently located and a traffic light corresponding to the lane may be identified from the created 3D image. Fusing of data is a technology concept widely used in sensor fusion that has recently been used in autonomous vehicles and thus a detailed description thereof will be omitted here.

The warning generator 318 generates a warning according to a determination result indicating violation of a traffic signal of the front vehicle 500, which is input from the controller 316. Here, the warning may include visual and audio data. The visual data may be a warning phrase displayed by a display screen in a vehicle. The audio data may be audio or voice data indicating a warning output from a speaker in a vehicle.

A V2X terminal 214 of the nearby vehicle 200 receives signal violation vehicle information from the rear vehicle 300 through V2V communication and inputs the signal violation vehicle information to the controller 216 of the nearby vehicle 200. Here, the signal violation vehicle information includes information indicating the presence or absence of the front vehicle 500, information about the front vehicle 500 such as the speed, position, and moving direction of the front vehicle 500, and the like as described above.

In addition, the V2X terminal 214 of the nearby vehicle 200 receives intersection topography information (map data) and traffic light information (SPaT) from the V2X base station 100 through V2I communication and inputs the received information to the controller 216.

The controller 216 of the nearby vehicle 200 determines whether there is a risk of collision with the front vehicle (signal violation vehicle) 500 with the nearby vehicle 200 in consideration of information about violation of a signal traffic of the front vehicle (signal violation vehicle) 500, which is obtained from the rear vehicle 300, intersection topography information and traffic light information, which are obtained from the V2X base station 100, and information of the position and speed of the nearby vehicle 200 and warns a driver of the nearby vehicle 200 of the risk of collision when there is the risk of collision.

When a driving operation of the nearby vehicle 200 satisfies the following conditions, a warning is given to the driver of the nearby vehicle 200. That is, even when the front vehicle 500 entering the intersection in a different direction violates a traffic signal, a warning is not given to the driver when the driving operation of the nearby vehicle 200 does not satisfy the following conditions:

condition 1) when the nearby vehicle 200 passes the center of the intersection at a certain speed or higher while the brake thereof is not stepped on; and condition 2) when the nearby vehicle 200 is stopped at a stop line, the color of a right-turn indicator lamp or a straight-direction indicator lamp changes from red to green, and a motion of the nearby vehicle 200 to be started is sensed, e.g., when the driver's foot is taken off of the brake, a state of a gear changes from N to D, or an accelerator pedal is stepped on.

The controller 216 of the nearby vehicle 200 may receive, from the rear vehicle 300, only a result of determining whether the front vehicle (signal violation vehicle) 500 is in violation of a traffic signal instead of the signal violation information related to the front vehicle (signal violation vehicle) 500.

In this case, the controller 216 of the nearby vehicle 200 does not need to receive signal violation vehicle information of the front vehicle (signal violation vehicle) 500 from the rear vehicle 300 and determine whether the front vehicle (signal violation vehicle) 500 is in violation of a traffic signal. Accordingly, the nearby vehicle 200 may reduce a processing time required to determine whether the front vehicle (signal violation vehicle) 500 is in violation of a traffic signal.

Figure 3:
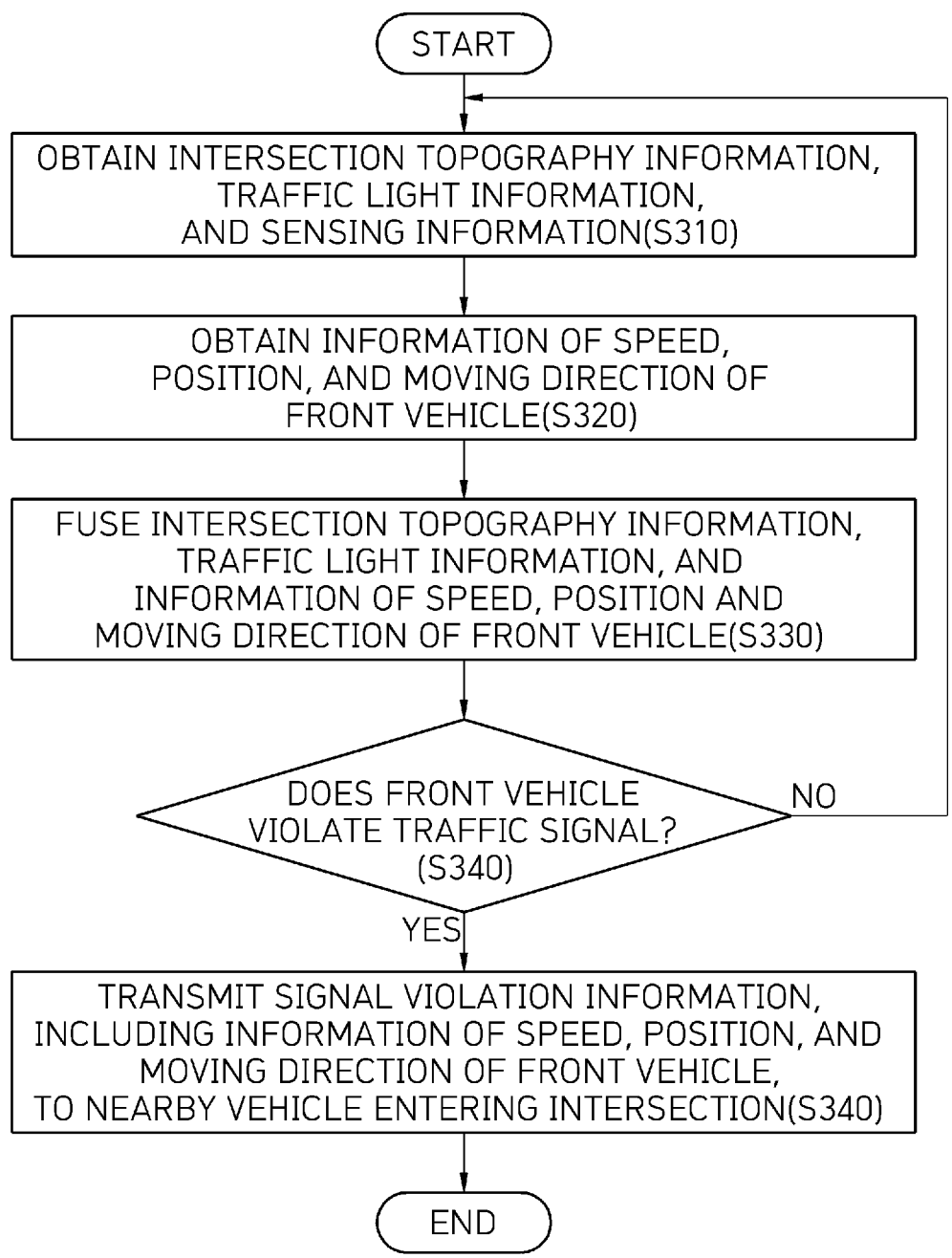
FIG. 3 is a flowchart of a process of identifying, by a rear vehicle, violation of a traffic signal of a front vehicle entering an intersection and transmitting a result of the identification to nearby vehicles according to an embodiment of the present invention.

FIG. 3 is a flowchart of a process of identifying violation of a traffic signal of a vehicle entering an intersection and informing nearby vehicles of the violation, the process being performed by a vehicle behind the vehicle in violation of the traffic signal according to an embodiment of the present disclosure.

Referring to FIG. 3, first, in S310, the rear vehicle 300 or the signal vehicle violation warning apparatus 310 receives and obtains intersection topography information and traffic light information from the V2X base station 100 through V2I communication. In this case, the traffic light information includes information indicating a state of a traffic light at the intersection and a time left until the color of the traffic light at the intersection changes to another color. In addition, the rear vehicle 300 or the signal vehicle violation warning apparatus 310 obtains sensing information by detecting the front vehicle 500 using the sensor unit 312. Here, the sensor unit 312 includes a camera, a LiDAR device, a radar device, an ultrasonic sensor, and the like.

Next, in S320, the front vehicle 500 is identified by obtaining information about the speed, position, and moving direction thereof on the basis of the sensing information obtained by the rear vehicle 300 or the signal vehicle violation warning apparatus 310.

Next, in S330, the rear vehicle 300 or the signal vehicle violation warning apparatus 310 fuses the intersection topography information, the traffic light information, and the information about the speed, position, and moving direction of the front vehicle 500.

Next, in S340, the rear vehicle 300 or the signal vehicle violation warning apparatus 310 determines whether the front vehicle 500 is in violation of or likely to violate a traffic signal at an intersection on the basis of the fusion information obtained by fusing the intersection topography information, the traffic light information, and information about the speed, position, and moving direction of the front vehicle 500. Here, for fusion of the information, data processing used in the field of data mining or an artificial neural network may be used.

When it is determined that the front vehicle 500 did not violate the traffic signal, the process returns to S310 and performs S310 to S330 again and proceeds to S350 when it is determined that the front vehicle 500 violates a traffic signal.

In S350, signal violation vehicle information, including information of the speed, position, and moving direction of the front vehicle 500, is configured as signal violation information and transmitted to the nearby vehicle 200 entering the intersection through V2V communication. In the present embodiment, an example in which the signal violation information is transmitted to one nearby vehicle 200 is described, but actually, the signal violation information is transmitted to all nearby vehicles entering the intersection.

Therefore, other nearby vehicles entering the intersection are notified of a dangerous situation (the presence of the signal violation vehicle (front vehicle) 500 entering the intersection in a different direction while being in violation of a traffic signal).

FIG. 4 is a flowchart of a process of generating a warning by a nearby vehicle on the basis of signal violation information of a front vehicle, which is obtained from a rear vehicle, according to an embodiment of the present disclosure.

Referring to FIG. 4, first, in S410, the nearby vehicle 200 or the V2X terminal 214 of the nearby vehicle 200 receives and obtains intersection topography information and traffic light information from the V2X base station 100. In addition, the nearby vehicle 200 or the V2X terminal 214 of the nearby vehicle 200 receives and obtains signal violation information of the front vehicle 500 from the rear vehicle 300. The intersection topography information, the traffic light information, and the signal violation information of the front vehicle 500 are input to the controller 216.

Next, in S420, the nearby vehicle 200 or the controller 216 of the nearby vehicle 200 obtains information of the position, speed, and moving direction of the nearby vehicle 200. Information of the position of the nearby vehicle 200 may be obtained from a GPS sensor mounted therein, and information about the speed of the nearby vehicle 200 may be obtained from a speed sensor mounted therein. Information of the moving direction of the nearby vehicle 200 may be obtained from an acceleration sensor or a gyro sensor mounted therein. The controller 216 may be connected to a GPS sensor, a speed sensor, an acceleration sensor, a gyro sensor, etc. through vehicle network communication (controller area network (CAN) communication or local interconnect network (LIN) communication) to obtain information of the position, speed, and moving direction of the nearby vehicle 200.

Next, in S430, the nearby vehicle 200 or the controller 216 of the nearby vehicle 200 fuses information of the position, speed, and moving direction of the nearby vehicle 200, the intersection topography information, and the traffic light information.

Next, in S440, the nearby vehicle 200 or the controller 216 of the nearby vehicle 200 determines whether there is a risk of collision between the nearby vehicle 200 and the front vehicle 500 based on the fusion information, which is obtained by fusing the information of the position, speed, and moving direction of the nearby vehicle 200, the intersection topography information, and the traffic light information, and the signal violation information of the front vehicle 500.

In the present disclosure, the nearby vehicle 200 may determine whether there is a risk of collision without calculating a collision time between the front vehicle 500 and the nearby vehicle 200.

A risk of collision may be accurately predicted through the calculation of the collision time but may be aggravated when an error occurs during the calculation.

That is, when the nearby vehicle 00 receives signal violation information indicating the presence of a vehicle entering an intersection in a different direction while in violation of a traffic signal, a collision time need not be calculated and a collision accident that may occur at the intersection may be fundamentally prevented when a warning is generated simultaneously with the reception of the signal violation information.

However, when the front vehicle 500 violating the traffic signal has already moved away from the intersection at a high speed, it is not necessary for the nearby vehicle 200 to generate a warning about a danger of collision.

In addition, as illustrated in FIG. 2, there will be no collision between the nearby vehicle 200 and the front vehicle 500 at an intersection and thus the nearby vehicle 200 need not generate a warning about a risk of collision even when signal violation information of the front device 500 is received from the rear vehicle 300 in a situation in which the front vehicle 500, the rear vehicle 200, and the nearby vehicles 200 enter the intersection along the same lane and in the same direction (a situation in which they are driving in a line of traffic) other than a situation in which the nearby vehicle 200 enters the intersection in a second direction and the rear vehicle 300 enters the intersection behind the front vehicle 500 entering the intersection in a first direction.

In this regard, the signal violation information should include information of the speed, position, and moving direction of the front vehicle 500 in violation of the traffic signal. However, as described above, a collision time between the nearby vehicle 200 and the front vehicle 500 in violation of the traffic signal need not be calculated by the nearby vehicle 200 even when the nearby vehicle 200 receives the signal violation information, including information of the speed, position, and moving direction of the front vehicle 500, from the rear vehicle 300.

In addition, the following conditions may be added in relation to determination of a risk of collision:

[condition 1] when a driver's own vehicle (e.g., the nearby vehicle 200) is driving at a certain speed or higher toward the center of an intersection while within a certain distance from an intersection stop line; and

[condition 2] when it is determined that the driver's own vehicle (e.g., the nearby vehicle 200) is stopped at the intersection stop line, a go-straight signal or a left-turn signal of a traffic light is on, and the driver is driving by taking his or her foot off the brake pedal, changing gears, or stepping on the accelerator.

Thereafter, in S450, when the above-described conditions are satisfied, the nearby vehicle 200 or the warning generator 218 of the nearby vehicle 200 gives the driver thereof a warning notifying that the front vehicle 500 in violation of a traffic signal is entering an intersection.

As described above, a driver of a nearby vehicle is warned when the nearby vehicle is moving toward the center of an intersection and a vehicle in violation of a traffic signal (a vehicle in front of the nearby vehicle) is moving toward the intersection in a different direction.

As described above, according to the present disclosure, when the front vehicle 500 violates or is likely to violate a traffic signal at an intersection, the rear vehicle 300 behind the front vehicle 500 generates signal violation information, including information of the speed, position and moving direction of the front vehicle 500, and transmits the signal violation information to the nearby vehicle 200 at the intersection and the nearby vehicle 200 warns a driver thereof about a risk of collision with the front vehicle 500, taking into account the received signal violation information, the position and moving direction of the nearby vehicle 200, and the like.

Alternatively, the nearby vehicle 200 may warn the driver of the risk of collision as soon as the signal violation information is received from the rear vehicle 300 without taking into account the position and moving direction of the nearby vehicle 200. That is, the warning generator 218 of the nearby vehicle 200 may warn the driver about a risk of collision under control of the controller 216 as soon as the signal violation information is received without calculating time of collision between the nearby vehicle 200 and the front vehicle 500 in violation with the traffic signal, a collision risk index, or the like. Therefore, a situation that aggravates a risk of collision due to an error occurring in the calculation of the time of collision, the collision risk index, or the like can be fundamentally prevented According to the present disclosure, when it is difficult to secure a field of vision using a V2X communication and a V2X sensor and a vehicle that is not equipped with a V2X terminal violates a traffic signal at an intersection, it is possible to warn a driver of a nearby vehicle entering the intersection of a risk of collision with the vehicle in violation of the traffic signal, thereby preventing an accident from occurring.

The present disclosure has been described above with respect to embodiments thereof. It will be understood by those of ordinary skill in the art that various modifications or changes may be made in the present disclosure without departing from essential features of the present disclosure. Therefore, the embodiments set forth herein should be considered in a descriptive sense only and not for purposes of limitation. The scope of the present disclosure is set forth in the claims rather than in the foregoing description, and all differences falling within a scope of an equivalent thereto should be construed as being included in the present disclosure.

What is claimed is:

1. An apparatus for providing a warning about a vehicle in violation of a traffic signal, which is mounted in a nearby vehicle entering an intersection in a second direction, the apparatus comprising:
   a first vehicle-to-everything (V2X) terminal mounted in the nearby vehicle, the first V2X terminal configured to receive signal violation information of a front vehicle, which enters the intersection in a first direction different from the second direction, from a second V2X terminal mounted in a rear vehicle driving behind the front vehicle through vehicle-to-vehicle (V2V) communication;
   a controller mounted in the nearby vehicle and configured to determine a risk of collision with the front vehicle using the signal violation information received from the second V2X terminal; and
   a warning generator mounted in the nearby vehicle and configured to generate a warning about the risk of collision according to a result of the determination received from the controller.

2. The apparatus of claim 1, wherein:
   the second V2X terminal is further configured to receive intersection topography information and traffic light information from a base station near the intersection through vehicle-to-infrastructure (V2I) communication; and
   the controller determines the risk of collision using the intersection topography information, the traffic light information, and the signal violation information, which are received from the second V2X terminal.

3. The apparatus of claim 2, wherein the controller obtains information of a speed, a position, and a moving direction of the front vehicle from sensors mounted in the nearby vehicle, obtains fusion information by fusing the information of the speed, position, and moving direction of the front vehicle, the intersection topography information, and the traffic lights, and determines the risk of collision with the front vehicle on the basis of the fusion information and the signal violation information.

4. The apparatus of claim 1, wherein the front vehicle is not equipped with a communication terminal to establish V2V communication with the nearby vehicle.

5. The apparatus of claim 1, wherein the controller determines the risk of collision by identifying whether the nearby vehicle and the front vehicle enter the intersection in different directions on the basis of information of a position, a speed, and a moving direction of the front vehicle, which are included in the signal violation information.

6. The apparatus of claim 5, wherein, during the determination of the risk of collision risk, the controller does not perform a process of calculating time of collision between the nearby vehicle and the front vehicle or a collision risk index using the information of the position, speed, and moving direction of the front vehicle.

7. An apparatus for warning a vehicle in violation of a traffic signal, which is mounted in a rear vehicle entering an intersection in a first direction, the apparatus comprising:
   a vehicle-to-everything (V2X) terminal mounted in the rear vehicle and configured to receive intersection topography information and traffic light information from a base station near the intersection through vehicle-to-infrastructure (V2I) communication;
   a sensor unit mounted in the rear vehicle and configured to obtain sensing information by sensing a front vehicle driving in front of the rear vehicle; and
   a controller mounted in the rear vehicle and configured to determine whether the front vehicle is in violation of a traffic signal at the intersection using the intersection topography information and the traffic light information, which are received from the V2X terminal, and the sensing information and transmit signal violation information corresponding to a result of the determination to a nearby vehicle entering the intersection in a second direction different from the first direction through the V2X terminal.

8. The apparatus of claim 7, wherein the controller obtains information of a speed, a position, and a moving direction of the front vehicle from the sensing information and determines whether the front vehicle is in violation of a traffic signal on the basis of fusion information obtained by fusing the information of the speed, the position, and the moving direction of the front vehicle, the intersection topography information, and the traffic light information.

9. The apparatus of claim 7, wherein the controller generates the signal violation information, including information about a speed, position, and moving direction of the front vehicle, when the result of the determination reveals that the front vehicle is in violation of the traffic signal.

10. A method of providing a warning about a vehicle in violation of a traffic signal, the method comprising:
   transmitting, by a second vehicle-to-everything (V2X) terminal mounted in a rear vehicle driving behind a front vehicle entering an intersection in a first direction, signal violation information to a first V2X terminal mounted in a nearby vehicle entering the intersection in a second direction different from the first direction through vehicle-to-vehicle (V2V) communication when the rear vehicle determines whether the front vehicle is in violation of a traffic signal at the intersection using sensing information obtained by sensing the front vehicle and determines that the front vehicle is in violation of the traffic signal; and
   generating, by the nearby vehicle, a warning about a risk of collision with the front vehicle using the signal violation information transmitted from the rear vehicle.

11. The method of claim 10, wherein the transmitting of the signal violation information comprises:
   receiving, by the second V2X terminal, intersection topography information and traffic light information from a base station near the intersection through vehicle-to-infrastructure (V2I) communication;
   obtaining, by a sensor unit of the rear vehicle, the sensing information by sensing the front vehicle; and
   determining, by a controller mounted in the rear vehicle, whether the front vehicle is in violation of the traffic signal at the intersection using the intersection topography information and the traffic light information, which are received from the second V2X terminal, and the sensing information, generating signal violation information corresponding to a result of the determination, and transmitting the generated signal violation information to the first V2X terminal mounted in the nearby vehicle.

12. The method of claim 11, wherein the transmitting of the signal violation information to the first V2X terminal mounted in the nearby vehicle comprises obtaining information of a speed, a position, and a moving direction of the front vehicle from the sensing information and determining whether the front vehicle is in violation of the traffic signal on the basis of fusion information obtained by fusing the information of the speed, the position, and the moving direction of the front vehicle, the intersection topography information, and the traffic light information.

13. The method of claim 10, wherein the generating of the warning comprises:
   receiving, by the first V2X terminal of the nearby vehicle, intersection topography information and traffic light information from a base station near the intersection using vehicle-to-infrastructure (V2I) communication and receiving the signal violation information from the second V2X terminal mounted in the rear vehicle through V2V communication; and
   determining, by a controller of the nearby vehicle, a risk of collision using the intersection topography information, the traffic light information, and the signal violation information.

14. The method of claim 13, wherein the determining of the risk of collision comprises:
   obtaining information of a speed, a position, and a moving direction of the front vehicle from sensors mounted in the nearby vehicle;
   obtaining fusion information by fusing the information of the speed, the position, and the moving direction of the front vehicle, the intersection topography information, and the traffic light information; and
   determining the risk of collision with the front vehicle on the basis of the fusion information and the signal violation information.

15. The method of claim 10, wherein the front vehicle is not equipped with a communication terminal to establish V2V communication with the nearby vehicle.

16. The method of claim 10, wherein the generating of the warning about the risk of collision with the front vehicle comprises generating, by the nearby vehicle, the warning as soon as the signal violation information is received.

17. The apparatus of claim 1, wherein, when determining the risk of collision with the front vehicle, the controller is configured to additionally consider at least one of following:
   whether or not the nearby vehicle is driving at a certain speed or higher toward a center of the intersection while within a certain distance from an intersection stop line; and
   whether or not the nearby vehicle is stopped at the intersection stop line, a go-straight signal or a left-turn signal of a traffic light is on, and the nearby vehicle is about to start driving.

18. The apparatus of claim 7, wherein the signal violation information is considered to determine a risk of collision by the nearby vehicle together with at least one of following:
   whether or not the nearby vehicle is driving at a certain speed or higher toward a center of the intersection while within a certain distance from an intersection stop line; and
   whether or not the nearby vehicle is stopped at the intersection stop line, a go-straight signal or a left-turn signal of a traffic light is on, and the nearby vehicle is about to start driving.

19. The method of claim 10, wherein the generating the warning is further based on at least one of following:
   whether or not the nearby vehicle is driving at a certain speed or higher toward a center of the intersection while within a certain distance from an intersection stop line; and
   whether or not the nearby vehicle is stopped at the intersection stop line, a go-straight signal or a left-turn signal of a traffic light is on, and the nearby vehicle is about to start driving.

* * * * *